Nov. 17, 1970  W. W. BUCHMAN  3,541,421
HIGH POWER FACTOR CIRCUIT FOR REACTIVE LOADS
Filed July 10, 1968  2 Sheets-Sheet 1

INVENTOR:
WILLIAM W. BUCHMAN
BY
Elliott & Pastoriza
ATTORNEYS

Nov. 17, 1970   W. W. BUCHMAN   3,541,421
HIGH POWER FACTOR CIRCUIT FOR REACTIVE LOADS
Filed July 10, 1968   2 Sheets-Sheet 2

INVENTOR:
WILLIAM W. BUCHMAN
BY
Elliott & Pastoriza
ATTORNEYS

United States Patent Office 3,541,421
Patented Nov. 17, 1970

3,541,421
HIGH POWER FACTOR CIRCUIT FOR REACTIVE LOADS
William W. Buchman, Los Angeles, Calif., assignor to Union Carbide Corporation, a corporation of New York
Filed July 10, 1968, Ser. No. 743,859
Int. Cl. H02p 13/26; H02m 7/20, 1/08
U.S. Cl. 320—1                                   7 Claims

ABSTRACT OF THE DISCLOSURE

A power supply circuit for energizing reactive loads from an initial A-C input signal line. In one embodiment, the load is a capacitor bank and the circuit itself is designed to charge the capacitor bank from the initial A-C line. This circuit includes switch means in the line for passing only given portions of the input A-C signal close to the peak voltage values of the signal. Means are provided for rectifying alternate half cycles so that the given portions of the original signal are all of one polarity. A series inductor is employed for storing energy from the given portions and transferring this energy to the capacitor. A free wheeling diode in turn is provided to define a return current path between the inductor and capacitor and thereby avoid charging current from passing back to the line. The switch means may constitute silicon controlled rectifiers and define the given portions at or near the peak of the voltage of the input sine wave so that current builds up in the load circuit near its maximum output voltage. As a result, the circuit operates at a high power factor. Excessive currents are prevented from flowing by opening the switch means before the voltage in the power cycle reverses.

---

This invention relates generally to electrical circuits and more particularly to a power source for reactive loads exhibiting a high power factor. The preferred embodiment of the invention takes the form of a capacitor charging circuit for charging up a capacitor bank to a desired given voltage value with greater economy than has been realized heretofore.

BACKGROUND OF THE INVENTION

Circuits for charging capacitors from an alternating current signal are well known in the art. In the classical phase control type of circuit employed for this purpose, control devices are turned on during that portion of the A-C signal cycle at which the alternating voltage has decreased below the value for which excessive currents would flow if the cycle were to continue, the devices being turned off automatically by the reversal of the power cycle. This type of circuit results in low levels of delivered power by the power source to the load since the instantaneous voltage is at a level at which current flow is below the peak of the alternating voltage waveform. The overall result is a reduced power factor on the source.

BRIEF DESCRIPTION OF THE PRESENT INVENTION

In accord with the circuit of the present invention, control devices or switch means such as silicon controlled rectifiers are utilized in an A-C signal line and are closed or turned on near the peak of the voltage of the half cycle A-C signals. There are thus provided given portions of the original A-C signal close to the peak voltage values. These portions may or may not be passed through a transformer, as desired, and are then rectified, the rectified portions in turn passing to the reactive load, which in the case of the preferred embodiment, constitutes a series connected inductor and capacitor to provide a capacitor charging circuit. Since the given portions of the original A-C signal are selected close to the peaks of the half cycles, the current builds up and flows through the power source near its maximum output voltage so that it operates at a high power factor. The control devices or switch means are operated in such a manner to be turned off or opened before the voltage across the switch means reverses as the power cycle continues and thus excessive currents are avoided.

The means for rectifying alternate half cycles of the given portions of signal selected from the original A-C signal include a free wheeling diode for providing a current path between the capacitor and series connected inductor so that charging of the capacitor can take place without charging current passing back to the line. In the event a transformer is employed, this current is thus blocked from passing back into the transformer windings. In the absence of such a free wheeling diode, any energy stored in the inductor during one part of the cycle would be transferred back into the line reducing the power factor and increasing transformer heating.

The invention also contemplates the provision of control circuit means including current responsive means connected in series with the capacitor and responsive to current flow in the inductor-capacitor circuit to control the period of time during which the switch means are closed. By this arrangement, the short time average current may be regulated to a constant value. In addition, the control circuit means may include a voltage sensing means connected across the capacitor for disabling the switch means after a given charge or voltage value on the capacitor has been reached.

The advantage of the foregoing system is that power may be extracted from the line near its peak voltage so that for the current flow at that time, maximum power flow is realized. Further, and as mentioned, because of the free wheeling diode, energy stored in the inductor does not have to be transferred back to the line. The overall result is a circuit having a greatly increased power factor over that which would result were the entire A-C signal to be employed.

BRIEF DESCRIPTION OF THE DRAWINGS

A better understanding of the invention will be had by now referring to a preferred embodiment thereof as illustrated in the accompanying drawings, in which.

DETAILED DESCRIPTION OF THE INVENTION

Figure 1:
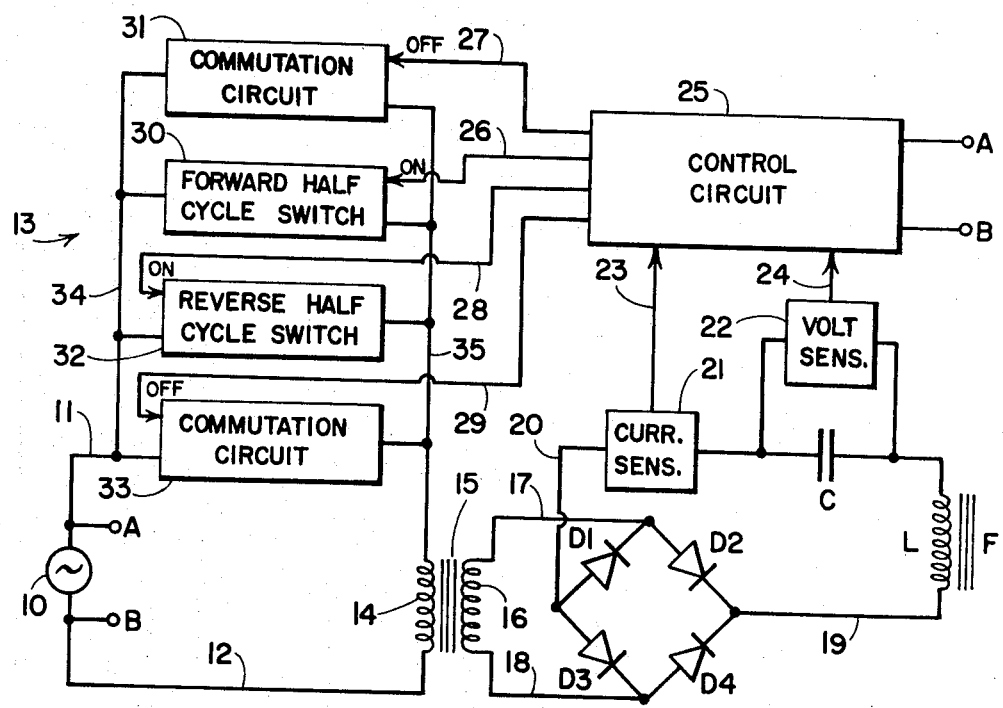
FIG. 1 is a diagram partly in block form illustrating a capacitor charging circuit incorporating the present invention.

Referring to FIG. 1, there is illustrated at the left portion of the circuit, an A-C signal source 10 providing an input A-C signal on input lines 11 and 12. A switch means designated generally by the arrow 13 is incorporated in the line 11 as shown. From the switch means 13, the line 11 connects to one end of a primary winding 14 for a transformer 15, the other end connecting to the input line 12. The secondary winding 16 for the transformer 15 connects through lines 17 and 18 to a rectifying means in the form of a simple bridge circuit comprised of diodes D1, D2, D3, and D4.

It should be understood that the transformer 15 is not necessary in the circuit in which event, the lines 17 and 18 would connect directly to the switch means and input power line 12 respectively. Output terminals from the full wave rectifying bridge comprising the diodes D1 through D4 connect through lines 19 and 20 to a reactive load in the form of a series connected capacitor C and inductor L. In the particular embodiment shown for illustrative purposes, the capacitor C represents a capacitor bank to be charged by the circuit of this invention to give a high voltage. In this particular application, the transformer 15 would ordinarily constitute a step up transformer to enable a high voltage charge to be rapidly provided on the condenser C.

A circuit sensing means 21 is provided in series with the capacitor circuit and a voltage sensing means in turn is connected across the capacitor itself as shown. Outputs from these sensing circuits are indicated at 23 and 24 respectively and pass into a control circuit 25. The control circuit 25 is responsive to the current sensed by the current sensor 21 to provide "on" and "off" trigger signals to the switch means 13. This control circuit is also responsive to a given voltage value developed across the condenser C and provided by the voltage sensor circuit 22 to disable the switch means whenever the voltage across the condenser C attains the given voltage value.

Thus, there are provided an output "on" trigger signal line 26, an "off" signal trigger line 27, an "on" signal trigger line 28, and an "off" signal trigger line 29 extending from the control circuit 25. The switch means is schematically indicated by the blocks 30, 31, 32, and 33 connected across lines 34 and 35 as shown. The on signal trigger line 26 connects to the block 30 constituting a forward half cycle switch. When this forward half cycle switch is closed, positive half cycles of the input A-C signal from the generator 10 will be passed to the primary of the transformer winding 14. A commutation circuit depicted by block 31 in turn is responsive to an "off" trigger signal on the line 27 to turn off the forward half cycle switch 30 thus opening this switch at the time that the "off" trigger signal is received on the line 27.

Similarly, the "on" trigger signal line 28 connects to a reverse half cycle switch represented by block 32 to close the switch or turn the same on during a given period of negative half cycles of the input A-C signal and the "off" trigger signal line 29 provides an "off" trigger signal to a commutation circuit depicted by block 34 which then opens or turns off the reverse half cycle switch 32 at a given time. Thus, given portions of the positive and negative half cycles of the input A-C signal between the lines 34 and 35 may be selected by the switch means as determined by the points in time at which the "on" and "off" signals are provided from the control circuit 25.

Figure 2:
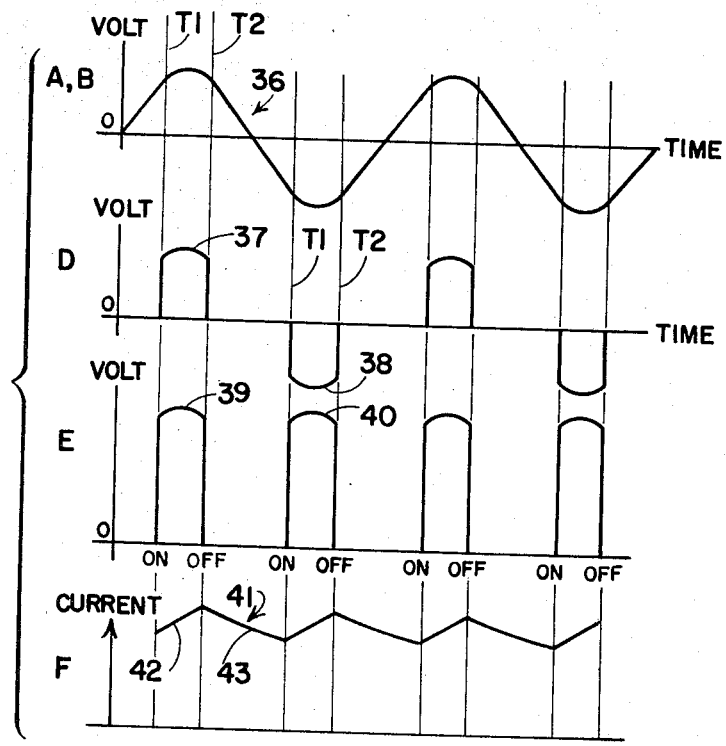
FIG. 2 illustrates a series of wave forms occurring at various points in the circuit of FIG. 1 useful in explaining the operation of FIG. 1.

In the various wave forms depicted in FIG. 2, the upper wave form illustrates at 36 the input A-C signal which may constitute a sine wave as shown. This signal appears across the generator 10 at the terminals A and B.

The next wave form D represents the given portions of the input A-C signal from the positive and negative half cycles that are selected close to the peaks of the signal by the switch means 13, these given portions appearing across the primary 14 of the transformer at the lettered point D of FIG. 1. Thus, if the forward half cycle switch is closed or turned on at the time T1 and opened or turned off at the time T2, a given portion 37 as shown in wave D will pass to the transformer. Similarly, if the reverse half cycle switch of FIG. 1 is closed or turned on at the time T1' and opened or turned off at the time T2', a given negative portion 38 will be passed to the transformer. The points in time T1, T2, T1', T2' and so forth are selected so that the given portions are closed to the peak voltage values of the input A-C signal.

If a step up transformer is employed, the output from the secondary after rectification in the full wave rectifying bridge of FIG. 1, will appear as indicated at 39 and 40 for the wave form E. These given portions are successively passed to the inductor L resulting in current flowing in the inductor indicated by the wave form 41 and designated F. During the on time or period during which the switch means is closed, the current flow increases as indicated at 42 to charge the inductor. This current is then transferred to the capacitor C to charge the capacitor as indicated by the portion 43 of the current curve 41 thereby placing a voltage across the capacitor C.

Figure 3:
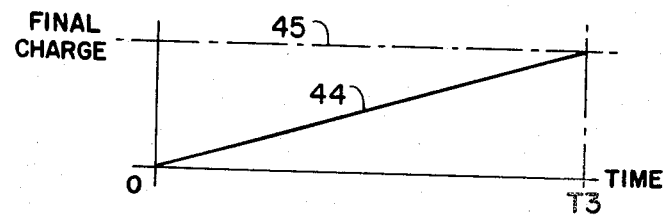
FIG. 3 is a charging curve for the capacitor circuit.

FIG. 3 illustrates over a long time scale the increase of the voltage across the capacitor C as a result of the successive current charges from the inductor. The average increase is indicated by the line 44. The horizontal dash line 45 in FIG. 3 designates a given voltage value representing a final value of voltage to which the capacitor C is to be charged. When the line 44 intersects this level 45, as, at time designated T3, a signal from the voltage sensor 22 of FIG. 1 is passed to the control circuit 25. As will become clearer as the description proceeds, this signal is employed to disable the switch means 13 and thus terminate operation of the circuit.

Figure 4:
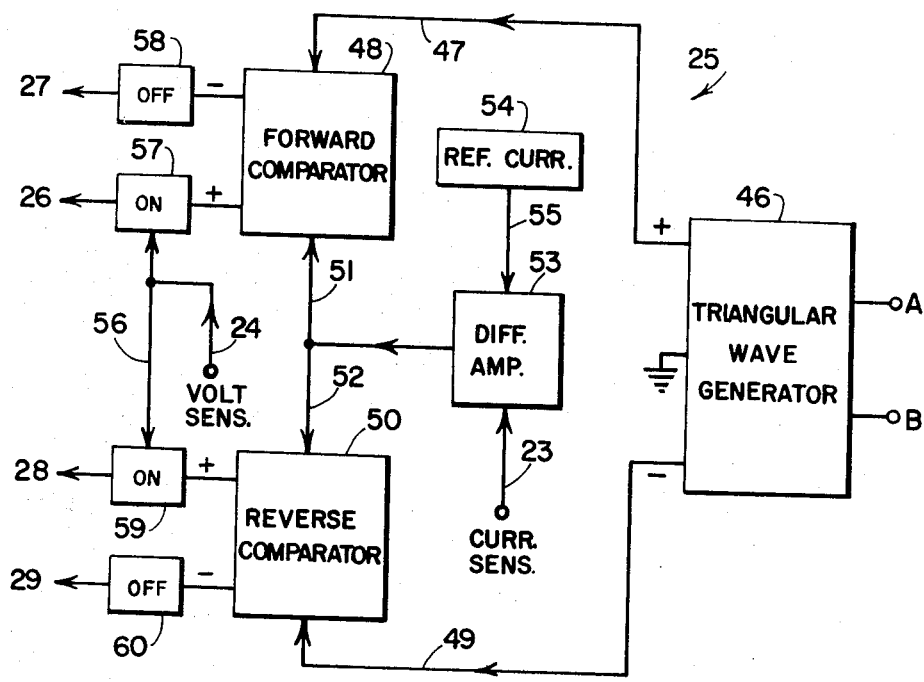
FIG. 4 is a block diagram of one type of control circuit utilized in the basic circuit of FIG. 1.

Referring now to FIG. 4, there is shown one type of circuit which may be utilized for the control circuit 25 of FIG. 1 in generating the desired "on" and "off" trigger signals. Since the generation of these trigger signals occur at precise points in time relative to the input A-C signal, it is necessary that the control circuit 25 be synchronized to the input signal on the line. Towards this end, there are provided input terminals A and B which correspond to the terminals A and B across the source 10 from the line.

Referring specifically to the right hand portion of the control circuit illustrated in FIG. 4, the input line signal is passed through a triangular wave generator 46 to provide a triangular wave form in exact synchronism with the sine wave form constituting the A-C signal. The output from the triangular wave generator provides two triangular wave forms 180° out of phase with each other as indicated by the + and − symbols. The plus wave form passes through line 47 to one side of a forward comparator 48. The minus wave form, 180° out of phase, passes through a line 49 to a reverse comparator 50. The other sides of the forward and reverse comparators are connected to lines 51 and 52 to receive the output from a differential amplifier 53. One side of this differential amplifier 53 connects to the current sensor output line 23 and the other side is connected to a reference current source 54 through lead 55.

The forward comparator serves to generate an "on" trigger signal in a circuit 57 connecting to the output "on" trigger signal line 26 at a given time T1. An output from the forward comparator also connects to an "off" trigger signal control circuit 58 having an output connecting to the "off" trigger signal line 27 for providing an "off" trigger signal at a given time T2.

Similar "on" trigger signals and "off trigger signals are generated by circuits 59 and 60 connected to the output of the reverse comparator 50 for passing these "on" and "off" signals to the "on" and "off" signal lines 28 and 29.

The lines in the block diagram of FIG. 3 having the same numerals as those designating circuit lines in FIG. 1 correspond to the same lines.

The control circuit is completed by passing the signal on output line 24 from the voltage sensing means 22 of FIG. 1 through line 56 to the "on" trigger generating circuits 57 and 59. As mentioned heretofore, the presence of such a signal functions to disable these "on" trigger generating circuits.

Figure 5:
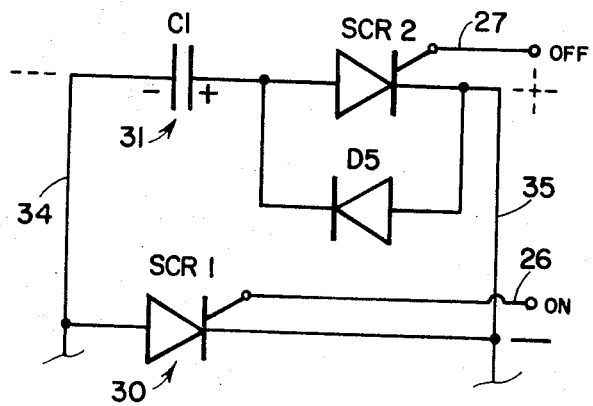
FIG. 5 is a schematic detailed circuit of the switch means used in the circuit of FIG. 1.

FIG. 5 illustrates the switch means and associated commutating circuit represented by the blocks 30 and 31 of FIG. 1 which constitute an important feature of the present invention. As shown, the forward half cycle switch 30 comprises a first silicon controlled rectifier SCR1 connected across the lines 34 and 35 with its gate terminal conected to the "on" trigger signal line 26. The commutation circuit 31 in turn includes a second silicon controlled rectifier SCR2 with its gate terminal connected to the "off" trigger signal line 27. A diode D5 oriented in reverse polarity to the second rectifier SCR2 shunts the rectifier as shown and a capacitor C1 is connected between the line 34 and anode of the rectifier SCR2.

The reverse half cycle switch 32 and associated commutation circuit 33 are comprised of the same components shown in FIG. 5 but are reverse connected; that is, the connections to line 34 in FIG. 5 connect to line 35 and the connections to line 35 connect to line 34.

In the circuit of FIG. 5, the capacitor C1 will be charged through diode D5 to a given voltage from the previous half cycle indicated by the dotted minus and plus signs on the lines 34 and 35. During the following forward half cycle when the lines 34 and 35 are charged plus and minus respectively as shown in solid lines. SCR1 is turned on by the "on" trigger signal in line 26. When an "off" trigger signal is received on SCR2, this second rectifier is caused to conduct thereby permitting C1 to discharge through SCR2 and apply a reverse voltage to SCR1. It is this reverse voltage which turns off SCR1. SCR2 is turned off by the reverse voltage occurring when the sine wave cycle reverses, and C1 is again charged up preparatory to discharge on the next positive half cycle. The process is then repeated.

To handle large currents, silicon controlled rectifiers or equivalent switches are necessary. These devices can readily be turned on but normally require a reversal of polarity to turn them off. By providing the commutation circuit described, the silicon controlled rectifier can be turned off at a desired point in time before the normal polarity reversal of the input sine wave occurs.

OPERATION

With the previous description of the various components in mind, the entire operation of the circuit will now be described. Initially, the various forward and reverse half cycle switches 30 and 33 of FIG. 1 are open or turned off. There are thus no signals passed from the transformer to the rectifier bridge and inductor-capacitor load. Assume that the voltage across the capacitor C is initially zero.

While no A-C signal is passed to the transformer 15 of FIG. 1, the A-C signal from generator 10 is applied through the terminals A and B to the control circuit 25. With particular reference to FIG. 4, this A-C signal is converted to a triangular wave form by the circuit 46. As mentioned, this triangular wave form is passed to the comparators 48 and 50. Initially, the reference current source 54 provides a reference current resulting in an output signal from the differential amplifier 53 sufficiently different from the triangular wave form signal received in the other side of the comparators that no intersection between the triangular wave and a trigger level established by the output from the differntial amplifier occurs. The comparators, accordingly, do not operate and no trigger voltages are generated.

To start the operation of the circuit, the current reference source is adjusted to a point that the output signal from the differential amplifier results in operation of the comparators. A first, operation takes place near the peak of the triangular wave forms so that "on" and "off" trigger signals are generated close to each other, an "on" trigger signal being generated when the upward sloping portion of the triangular wave form intersects the programmed trigger voltae level from the differential amplifir 53 and an "off" trigger signal being generated when the downwardly sloping side of the triangular wave form intersects this trigger level.

By now further varying the reference current to the differential amplifier, the interval between the "on" and "off" generated signals from the comparators increases on either side of the triangular wave form.

With reference now to the wave forms of FIG. 2, assume that the "on" and "off" trigger signals from the control circuit occur at the times T1 and T2 as described heretofore. The resulting given portions of the A-C signal pass through the transformer, rectifying bridge, to the inductor-capacitor circuit wherein the charging of the capacitor commences. At this time, the current sensor 21 will detect current flow from the rectifying bridge resulting in an output from the current sensor on line 23 to the control circuit. This current signal is passed to the differential amplifier 53 and in effect cancels the signal from the current reference source. By utilizing a high gain differential amplifier at 53, the feedback arrangement essentially serves to regulate the short time average current to a constant value. The current flow can thus be limited to a safe value by the control circuit as described.

As the condenser C continues to charge, it will eventually attain the given voltage defined by the voltage level line 45 of FIG. 3. At this time, designated T3, there will result a voltage signal from the voltage sensor 22 on the line 24 which passes to the "on" trigger signal generators 57 and 59 as described in FIG. 4. This signal is of such polarity as to disable these generator circuits so that once the forward and reverse half cycle switches 30 and 33 of FIG. 1 are turned off, the entire circuit is essentially disabled and the capacitor will have attained its maximum desired charge.

An important feature of this invention, in addition to the switch means described in FIG. 5, involves the use of a free wheeling diode means. In this respect, the particular bridge circuit employed for the rectifying means in FIG. 1 constituting the diodes D1 through D4 inherently includes such a free wheeling diode means. Thus, current flow between the inductor L and capacitor C can take place through the diodes D1, D2, or D3, D4 in the bridge circuit during off periods of the switch means. The energy stored in the inductor can therefore be used to charge the capacitor without charging current passing back through the transformer winding. In the event a conventional full wave rectifier were employed rather than the particular bridge rectifier circuit shown, the free wheeling diode means could be provided by the addition of another diode properly oriented to provide the desired current path so as to avoid current passing back into the line. As mentioned heretofore, without the free wheeling diode means, current buildup in the inductor would have to flow in the transformer and therefore the energy stored in the inductor during one part of the cycle would be transferred back into the line thereby reducing the power factor and increasing transformer heating.

As also mentioned heretofore, the basic advantage of the system as described resides in the fact that power can be abstracted from the line or generator near the peak voltage so that for the current flow during this time, maximum power flow is realized.

From the foregoing description, it will thus be evident that the present invention has provided a greatly improved power circuit for reactive loads particularly useful for charging capacitor banks wherein a power factor higher than the power factor that would conventionally result with known phase control circuitry is realizable.

I claim:

1. A high power factor circuit for supplying a load from an A-C input signal line, comprising:
   (a) switch means connected in said line, said switch means including:
      (1) a forward half cycle switch responsive to an "on" trigger signal to close and an "off" trigger signal to open; and
      (2) a reverse half cycle switch responsive to an "on" trigger signal to close and an "off" trigger signal to open, whereby given portions only of the positive and negative half cycles of said A-C signal can be provided in accordance with the time intervals during which said forward and reverse half cycle switches are closed respectively, said forward half cycle switch comprising a first controlled rectifier having a gate terminal connected to receive "on" trigger signals during positive half cycles; and a commutation circuit including a second controlled rectifier having a gate terminal connected to receive "off" trigger signals during positive half cycles, a diode oriented in reverse polarity shunting said second controlled rectifier, and a capacitor connected between the input line and anode of said second controlled rectifier, whereby a given voltage charge on said capacitor acquired through said diode during the preceding cycle of said imput sine wave applies a reverse polarity to said first controlled rectifier in response to an "off" trigger signal received on said second controlled rectifier to thereby shut-off said first controlled rectifier, said reverse half cycle switch having a commutation circuit and components similar to said forward half cycle switch and first mentioned commutation circuit connected to receive "on" and "off" trigger signals during negative half cycles;

(b) rectifier means connected between said switch means and load; and (c) control circuit means responsive to current flow in said load for providing said "on" and "off" trigger signals and thereby controlling the time period during which said switch means are on thereby regulating said current flow.

2. The subject matter of claim 1, in which said load comprises a series connected inductor and capacitor for receiving said given portions and successively transferring from said inductor a charge to said capacitor, said control circuit means including voltage sensing means connected across said capacitor and responsive to a given value of voltage buildup across said capacitor for disabling said switch means so that operation of said circuit is terminated, whereby a capacitor charging circuit is provided in which a capacitor is charged at a given power factor higher than the power factor that would result when the entire portions of said A-C signal are used.

3. The subject matter of claim 2, in which said rectifier means includes free wheeling diode means for providing a current path between said inductor and capacitor to thereby permit charging of said capacitor without the charging current passing back to said line.

4. A circuit for charging a capacitor to a given voltage from an A-C input signal line, comprising, in combination:

(a) switch means connected in said line, said switch means including:
  (1) a forward half cycle switch responsive to an "on" trigger signal to close and an "off" trigger signal to open; and
  (2) a reverse half cycle switch responsive to an "on" trigger signal to close and an "off" trigger signal to open, whereby given portions only of the positive and negative half cycles of said A-C signal including their peaks can be provided in accordance with the time intervals during which said forward and reverse half cycle switches are closed, respectively, said forward half cycle switch comprising a first controlled rectifier having a gate terminal connected to receive "on" trigger signals during positive half cycles; and a commutation circuit including a second controlled rectifier having a gate terminal connected to receive "off" trigger signals during positive half cycles, a diode oriented in reverse polarity shunting said second controlled rectifier, and a capacitor connected between the input line and anode of said second controlled rectifier, whereby a given voltage charge on said capacitor acquired through said diode during the preceding cycle of said input sine wave applies a reverse polarity to said first controlled rectifier in response to an "off" trigger signal received on said second controlled rectifier to thereby shut-off said first controlled rectifier, said reverse half cycle switch having a commutation circuit and components similar to said forward half cycle switch and first mentioned commutation circuit connected to receive "on" and "off" signals during negative half cycles;

(b) rectifier means connected to receive said given portions and rectify said negative half cycles;

(c) an inductor connected to said capacitor to be charged to define a series circuit, said series circuit being connected across the output of said rectifier means, said inductor receiving said given portions after rectification and transferring successive charges in response to successive given portions to said capacitor; and (d) control circuit means including:
  (1) trigger signal generating means connected to said forward and reverse half cycle switches for providing "on" and "off" trigger signals thereto to define said time intervals;
  (2) current sensing means connected in series with said capacitor; and
  (3) an independently adjustable current reference source, said control circuit being responsive to current flow in said capacitor having a given relationship to a preset current from said current reference source to cause generation of said "on" and "off" trigger signals at points in time to define said time intervals such that said current flow is regulated.

5. The subject matter of claim 4, in which said rectifier means includes a free wheeling diode means for providing a direct current path in one direction between said inductor and capacitor to thereby permit charging of said capacitor without the charging current passing back to said line.

6. The subject matter of claim 4, in which said control circuit means further includes a voltage sensing means connected across said capacitor; and disabling means responsive to a given value of voltage across said capacitor connected to said switch means to maintain said switch means open.

7. The subject matter of claim 4, including a step-up transformer connected in said line to increase the voltage value of said A-C signal.

References Cited
UNITED STATES PATENTS

| | | | |
|---|---|---|---|
| 3,185,912 | 5/1965 | Smith et al. | 323—22 X |
| 3,300,656 | 1/1967 | Maier et al. | 320—1 X |
| 3,372,326 | 3/1968 | Stefanov | 321—24 |
| 3,377,542 | 4/1968 | Glorioso | 320—1 X |
| 3,432,725 | 3/1969 | Rotch | 315—241 |

BERNARD KONICK, Primary Examiner

J. F. BREIMAYER, Assistant Examiner

U.S. Cl. X.R.

315—241, 243; 321—18, 45; 323—22, 24